June 2, 1942.　　F. T. HARRINGTON　　2,284,897
POWER TRANSMISSION
Filed Oct. 26, 1940
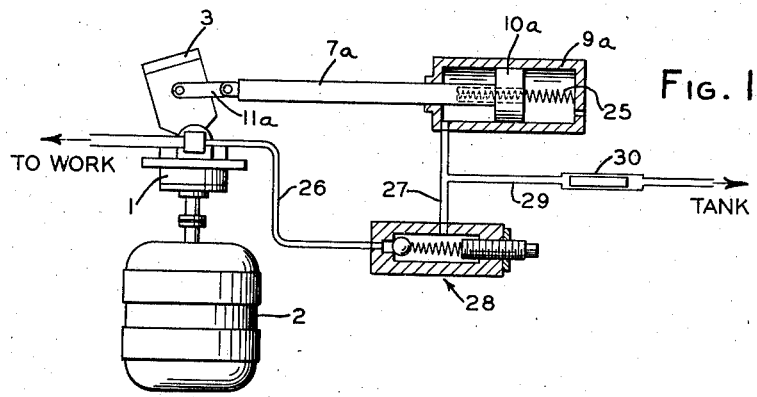
Fig. 1
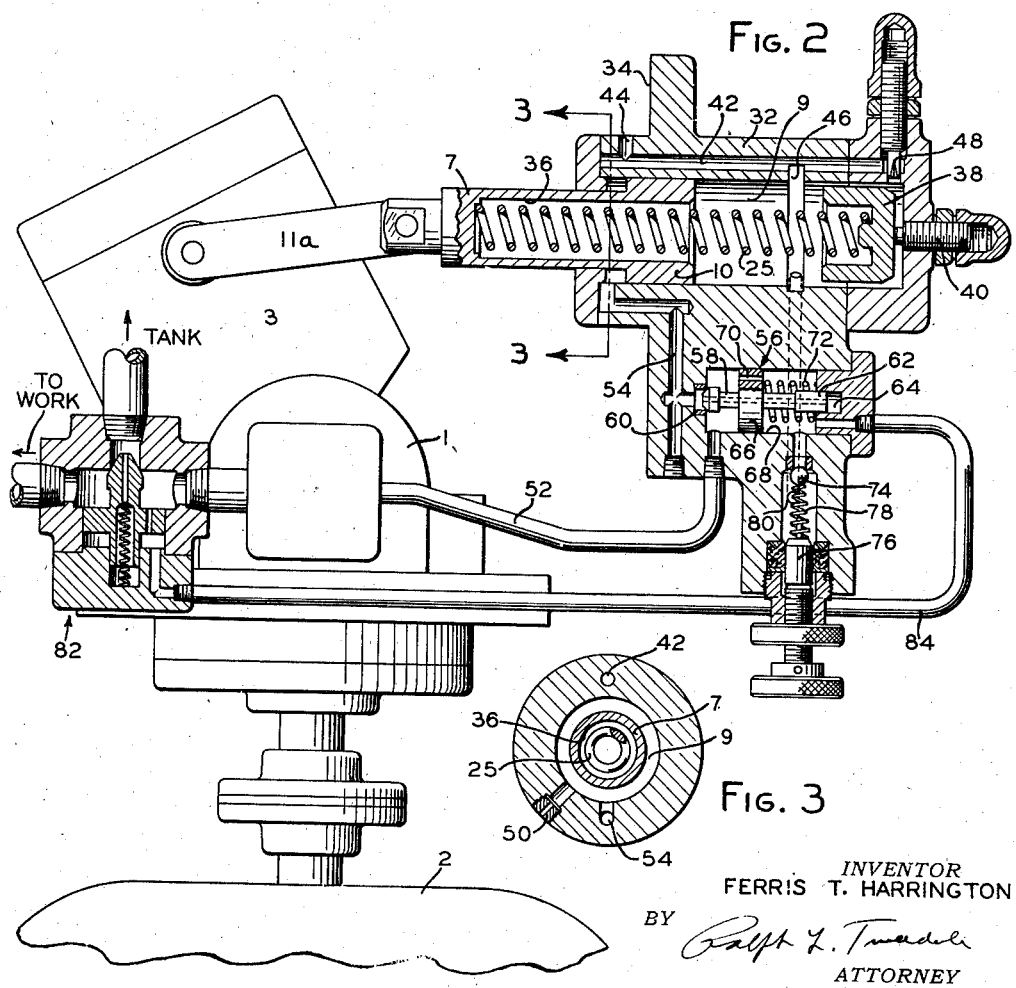
Fig. 2
Fig. 3
INVENTOR
FERRIS T. HARRINGTON
BY
ATTORNEY Patented June 2, 1942

2,284,897

UNITED STATES PATENT OFFICE 2,284,897

POWER TRANSMISSION

Ferris T. Harrington, Detroit, Mich., assignor to Vickers Incorporated, Detroit, Mich., a corporation of Michigan Application October 26, 1940, Serial No. 362,955

6 Claims. (Cl. 103—38)

This invention relates to a constant pressure compensator and has particularly to do with a device to be used with a variable displacement pump to maintain a substantially constant pump pressure within the volumetric range of the pump.

This application is a continuation in part of Harrington application Serial No. 173,004, filed November 5, 1937, now Patent No. 2,248,076, for Constant pressure regulator and includes subject matter divided out of that application.

In previous pressure compensating control devices it has been customary to back the control piston with a very stiff spring, and it has not been possible to obtain a smooth non-chattering action on the control. The present invention cotemplates backing the control piston with a pressure regulator chamber as well as a spring whereby a smooth and accurate control may be obtained.

It is an object of this invention to provide a volumetric control for a variable volume pump whereby the pump output may be varied from maximum to zero while the pump pressure is varying from zero to a maximum. The invention is used especially in large sheet metal stamping machines or presses in which a constant or decreasing pump volume is required as the press closes, and when the press reaches the lower end of its stroke a maximum pump pressure is maintained with substantially no pump volume. In this way the press may be used to iron out the wrinkles in a stamping. In general the control is adapted for use where it is desirable on some jobs to cut off rapidly from full volume, full pressure, to practically no volume, peak pressure, accompanied by decrease in horsepower input.

Further objects and advantages of the present invention will be apparent from the following description, reference being had to the accompanying drawing wherein a preferred form of the present invention is clearly shown.

In the drawing:

Figure 1 is a diagrammatic view of a variable displacement pump and pressure compensating mechanism showing one form of the present invention.

Figure 2 is a diagrammatic view of a variable displacement pump and pressure regulator showing in cross section a modified construction of the pressure regulator.

Figure 3 is a cross section taken on line 3—3 of Figure 2.

The embodiment of the invention shown in Figure 1 is of simplified form and illustrates the basic principle of operation upon which the present invention is founded. In this embodiment the motor 2 drives the variable delivery pump 1 having a movable swivel head 3. A cylinder 9a has within its walls a piston 10a with a rod 7a extending through the end of the cylinder and connected to the swivel head 3 by a link 11a. A spring 25 urges the piston 10a toward the left end of the cylinder 9a and has sufficient strength to move the swivel head 3 to its full volume position. Between conduits 26 and 27, which connect the pump outlet to the left end of the cylinder 9a, is located an adjustable relief valve 28 adapted to admit liquid from the conduit 26 to the conduit 27 when the pump pressure reaches a certain predetermined point. The conduit 27 is connected to the tank by a conduit 29 in which is located a restriction 30.

In the operation of this embodiment shown in Figure 1, after the pressure at the work end in the pump 1 develops to a certain point, relief valve 28 will admit liquid under pressure to the piston 10a and tend to reduce the volume output of the pump by moving the swivel head 3 to the right. The size of the restriction 30 in this embodiment will regulate the speed at which the piston 10a may be moved and it will be noticed that when the pressure in the pump again reduces to below the setting of the relief valve 28, the restriction 30 will regulate the speed at which the piston 10a returns to its normal position thereby controlling the increase in the volume output of the pump.

It will be noted that the force of the spring 25 determines the pressure in cylinder 9a under all equilibrium conditions since the oil pressure pressing against the lefthand face of piston 10a must exactly balance the force of spring 25. Since the cylinder pressure is transmitted to the chamber behind the relief valve 28, any variations in cylinder pressure will cause corresponding variations in the pump delivery pressure in line 26 since the cylinder pressure will assist the spring in the relief valve urging the ball toward its seat. Thus, the characteristic of spring 25, that is, the change in its total force as the spring is progressively compressed, causes a corresponding progressive increase in the pump operating pressure as the pump stroke is reduced. In this way the characteristic of spring 25 may be made such as to produce any desired characteristic between pump displacement and delivery pressure.

Referring now to the form of the invention illustrated in Figure 2, there is illustrated a variable displacement pump 1 driven by a motor 2 and having a swinging yoke or head 3 similar to that illustrated in Figure 1. The link 11a connects to the rod or stem 7 of a piston 10 slidable in a cylinder 9. The latter is formed in a block 32 adapted to be mounted by means of a mounting flange surface 34 on a suitable casing, not shown, which carries the pump 1.

The spring 25 is mounted between the lefthand end of a bore 36 formed in the piston 10 and an adjustable piston abutment 38 carried in the righthand end of cylinder 9. A suitable adjusting screw 40 is provided in the end wall of the cylinder for this purpose. The abutment 38 provides a means for limiting the stroke of the piston 10, and, although it does at the same time adjust the degree of compression of spring 25, this adjustment of the spring does not affect the action of the regulator as will be hereafter explained.

The righthand end of cylinder 9 is connected with the tank by means of a passage 42 having a branch 44 opening to the interior of the casing on which the regulator is mounted and communicating with the righthand end of cylinder 9 by means of an eccentrically turned slot 46 somewhat to the left of the end of the cylinder. This slot 46 is adapted to be cut off by the piston 10 as it approaches its righthand limit of movement, and thereafter all oil discharged from the righthhand end of cylinder 9 must pass through an adjustable restriction orifice 48 which is placed between the extreme righthand end of cylinder 9 and the passage 42. The lefthand end of cylinder 9 is in communication with the tank by means of a restricted orifice 50 (see Figure 3) and which corresponds to the orifice 30 in Figure 1.

A passage 52—54 corresponds to the passage 26—27 of Figure 1 and has in series therewith a balanced relief valve generally designated 56.

This valve is similar in construction to that illustrated in the patent to Harry F. Vickers, No. 2,043,453. Thus the valve may comprise a hollow stem 58 adapted to seat on an annular seat 60 to close communication between passages 52 and 54. At its opposite end the stem is provided with a cylindrical portion 62 of a diameter equal to the seat diameter and slidable in a cylindrical recess 64 to balance the valve with respect to pressure in conduit 54. The valve is further provided with a piston 66 slidable in a cylinder 68 having a restricted orifice 70 extending through the piston, a light spring 72 biasing the valve to the left, while the space to the right of the piston communicates with a pilot relief valve 74 having an adjusting screw 76 for adjusting the setting of its spring 78. Oil discharged through the pilot valve 74 returns to tank through a passage 80 which communicates with the slot 46, and, because the latter is of annular form, is not blocked off when the piston 10 moves across the slot 46.

The operation of this form of the invention is somewhat similar to that of the embodiment illustrated in Figure 1 with the exception that the variations in force exerted by spring 25 under varying degrees of compression have no effect on the delivery pressure of the pump. The only change in pump pressure which is even theoretically present is that due to varying compression of the spring 72. This change is extremely minute, however, in actual practice and may be neglected since the amount of movement of the valve 56 between fully closed and fully open position is but a small percentage of the total length of spring 72, and, in addition, the force of spring 72 is but a small percentage of the total force acting on the righthand face of piston 66. Thus, as the spring 25 is compressed, the pressure in the lefthand end of cylinder 9 must rise to correspond to the increased force exerted by spring 25. At this higher pressure, orifice 50 will pass a larger quantity of oil to the tank, and accordingly the relief valve 58 must open somewhat wider to even hold the piston stationary. However, the factor which controls relief valve 56 is the setting of spring 78 of pilot valve 74 as is fully described in the Vickers patent above referred to. Since the pilot valve 74 is always subjected to tank pressure on its rear side, it will be seen that increases in pressure in the lefthand end of cylinder 9 cannot produce corresponding increases in pressure in conduit 52.

In installations such, for example, as hydraulic presses, where the work suddenly stops taking the flow of oil from the pump, it is sometimes desirable to avoid momentary pressure peaks which would otherwise occur during the interval while the piston 10 is moving to its righthand position. This is readily accomplished with the present regulator by using a relief valve 82 in the pump delivery line and constructed similarly to valve 56. A smooth action of the system is insured by connecting the control chamber of valve 82 to the control chamber of valve 56 as by the conduit 84, thus placing both relief valves under the control of pilot relief valve 74. Obviously the relief valve 82 may have a pilot relief valve also if desired in which event the latter would be adjusted to a higher setting than valve 74 and would serve merely as an overload limit in the event of derangement of valve 74.

While the form of embodiment of the invention as herein disclosed constitutes a preferred form, it is to be understood that other forms might be adopted, all coming within the scope of the claims which follow.

What is claimed is as follows:

1. A pressure-actuated volume control unit adapted to be used with a variable delivery pump comprising a cylinder housing, a slidable piston located therein having an operable connection with a volume control member of said pump, means normally urging said piston to full volume position, a pressure connection between an outlet of said pump and one end of said cylinder, a pressure responsive relief valve in series in said pressure connection, and a tank connection opening from said cylinder beyond the relief valve, said tank connection being substantially restricted but constantly open to continuously bleed fluid from said cylinder at a low rate.

2. A pressure actuated volume control unit adapted to be used with a variable delivery pump comprising a cylinder housing, a slidable piston located therein having an operable connection with a volume control member of said pump, means normally urging said piston to a full volume position, a pressure connection between an outlet of said pump and one end of said cylinder whereby pressure from said pump tends to move said piston to a no volume position, a pressure responsive relief valve in series in said pressure connection, a tank connection opening from said cylinder housing beyond the relief valve, and a restriction in said tank connection for controlling the movement of said piston toward full volume position.

3. In a variable stroke pump controller the combination of a cylinder and piston connected with a movable part of the pump to vary the stroke thereof, a spring biasing said part to one limit of its travel, a conduit connecting the pump delivery line to the cylinder, a pilot-controlled relief valve in series in said conduit, a restricted outlet from said cylinder to tank pressure, and a pilot relief valve having its exhaust side discharging freely to tank and arranged to control the opening of the first relief valve to maintain the pressure in the delivery line constant independently of the varying compression of said spring.

4. In a variable stroke pump controller the combination of a cylinder and piston connected with a movable part of the pump to vary the stroke thereof, a spring biasing said part to one limit of its travel, a conduit connecting the pump delivery line to the cylinder, and means including a fixed restriction and a relief valve for determining the rate of change of volume of fluid in said cylinder in accordance with the trend of pressure changes in the delivery line, said relief valve being responsive solely to the pressure in the delivery line with respect to tank presssure whereby the controller may regulate the pump independently of the varying force of said spring.

5. In a variable stroke pump controller the combination of a cylinder and piston connected with a movable part of the pump to vary the stroke thereof, means biasing said part to one limit of its travel, a conduit connecting the pump delivery line to the cylinder, and means including a fixed restriction and a pilot-controlled relief valve for determining the rate of change of volume of fluid in said cylinder in accordance with the trend of pressure changes in the delivery line, said relief valve having a pilot relief valve connected between delivery line pressure and tank pressure.

6. In a variable stroke pump controller the combination of a cylinder and piston connected with a movable part of the pump to vary the stroke thereof, means biasing said part to one limit of its travel, a conduit connecting the pump delivery line to the cylinder, a pilot-controlled relief valve for determining the operation of said piston to regulate the pump displacement in accordance with delivery pressure, a pilot-controlled relief valve for by-passing the full pump delivery, and a common pilot relief valve having connection with both said pilot-controlled valves for jointly controlling said pilot-controlled valves.

FERRIS T. HARRINGTON.